(12) United States Patent
Baek et al.

(10) Patent No.: US 9,045,608 B2
(45) Date of Patent: Jun. 2, 2015

(54) HIGHLY INSULATING POLYURETHANE FOAM AND METHOD FOR MANUFACTURING SAME

(71) Applicant: Cheil Industries Inc., Gumi-si (KR)

(72) Inventors: Kyung Hyun Baek, Uiwang-si (KR); Jung Bae Jun, Uiwang-si (KR); Jung Kyu Ju, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 162 days.

(21) Appl. No.: 13/761,749

(22) Filed: Feb. 7, 2013

(65) Prior Publication Data

US 2013/0150470 A1     Jun. 13, 2013

Related U.S. Application Data

(63) Continuation-in-part of application No. PCT/KR2010/009550, filed on Dec. 30, 2010.

(30) Foreign Application Priority Data

Aug. 24, 2010  (KR) ........................ 10-2010-0082116

(51) Int. Cl.

| C08G 64/00 | (2006.01) |
|---|---|
| C08J 9/228 | (2006.01) |
| C08J 9/00 | (2006.01) |
| C08J 9/32 | (2006.01) |
| C08J 9/14 | (2006.01) |
| C08G 75/04 | (2006.01) |
| C08G 101/00 | (2006.01) |
| C08K 9/10 | (2006.01) |

(52) U.S. Cl.
CPC ......... *C08J 9/228* (2013.01); *C08G 2101/0008* (2013.01); *C08J 9/0066* (2013.01); *C08J 9/32* (2013.01); *C08K 9/10* (2013.01); *C08J 9/141* (2013.01); *C08J 2201/022* (2013.01); *C08J 2203/14* (2013.01); *C08J 2203/182* (2013.01); *C08J 2203/22* (2013.01); *C08J 2205/052* (2013.01); *C08J 2205/10* (2013.01); *C08J 2375/08* (2013.01)

(58) Field of Classification Search
USPC ........................................ 521/52, 59, 82, 155
See application file for complete search history.

(56) References Cited

U.S. PATENT DOCUMENTS

| 5,604,265 | A | 2/1997 | De Vos et al. |
|---|---|---|---|
| 6,166,109 | A | 12/2000 | Spitler et al. |
| 7,202,284 | B1 | 4/2007 | Limerkens et al. |
| 7,230,036 | B2 | 6/2007 | Gloriioso, Jr. et al. |
| 7,435,762 | B2 * | 10/2008 | Burgess et al. .................. 521/99 |
| 7,893,123 | B2 | 2/2011 | Luisi |
| 2004/0176486 | A1 | 9/2004 | Glorioso et al. |
| 2005/0079352 | A1 | 4/2005 | Glorioso et al. |
| 2005/0154072 | A1 | 7/2005 | Suck et al. |
| 2011/0124753 | A1 | 5/2011 | Baek et al. |

FOREIGN PATENT DOCUMENTS

| JP | 10-168150 A | 6/1998 |
|---|---|---|
| JP | 2005-054163 A | 3/2005 |
| JP | 2005-088559 A | 4/2005 |
| KR | 10-2005-0073500 A | 7/2005 |
| KR | 2004-0034455 A | 7/2005 |
| KR | 10-0666110 B1 | 1/2007 |
| KR | 2009-114962 A2 | 6/2011 |
| WO | 00/44821 A1 | 8/2000 |
| WO | 02/096635 A1 | 12/2002 |
| WO | 2006/027671 A1 | 3/2006 |
| WO | 2007/045586 A1 | 4/2007 |
| WO | 20121026654 A1 | 3/2012 |

OTHER PUBLICATIONS

International Search Report in counterpart International Application No. PCT/KR2010/009550 dated Sep. 27, 2011, pp. 1-2.
Chinese Office Action in counterpart Chinese Application No. 201080068767.8 dated Nov. 5, 2013, pp. 1-7.
Office Action in commonly owned U.S. Appl. No. 12/952,280, mailed Sep. 8, 2014, pp. 1-11.
Office Action in commonly owned U.S. Appl. No. 12/952,280, mailed Feb. 5, 2013, pp. 1-7.
Final Office Action in commonly owned U.S. Appl. No. 12/952,280, mailed Aug. 28, 2013, pp. 1-7.
Extended European Search Report in counterpart European Application No. 10856479.0 dated Jun. 13, 2014, pp. 1-11.

* cited by examiner

*Primary Examiner* — Terressa Boykin
(74) *Attorney, Agent, or Firm* — Additon, Higgins & Pendleton, P.A.

(57) ABSTRACT

The rigid polyurethane foam includes thermally expandable fine particles disposed between two or more adjacent cells, so as to be exposed to the inside and/or the outside of a unit cell, and a filler which is dispersed on the surface of the thermally expandable fine particles and/or on the inner and/or outer surfaces of the unit cell. The cells of the rigid polyurethane foam can be small and uniform in size and can be highly insulating.

19 Claims, 3 Drawing Sheets

HIGHLY INSULATING POLYURETHANE FOAM AND METHOD FOR MANUFACTURING SAME

CROSS-REFERENCE TO RELATED APPLICATIONS

This application is a continuation-in-part of International Application No. PCT/KR2010/009550 filed on Dec. 30, 2010, pending, which designates the U.S., published as WO 2012/026654, and is incorporated herein by reference in its entirety, and claims priority therefrom under 35 USC Section 120. This application also claims priority under 35 USC Section 119 to and the benefit of Korean Patent Application No. 10-2010-0082116 filed on Aug. 24, 2010, the entire disclosure of which is incorporated herein by reference.

FIELD OF THE INVENTION

The present invention relates to highly insulating rigid polyurethane foam and a method for manufacturing the same.

BACKGROUND OF THE INVENTION

Thermal conductivity of polyurethane foam is determined by the sum of thermal conductivity ($\lambda m$) of a polyurethane resin itself, thermal conductivity ($\lambda g$) of a blowing agent gas component present in a polyurethane foam cell, and radiant thermal conductivity ($\lambda r$). Among these, the thermal conductivity ($\lambda g$) of the blowing agent gas component is about 60 to about 70% of the overall thermal conductivity of the polyurethane resin. However, since the use of conventional fluorocarbon-based blowing agents is restricted due to their high global warming potential (GWP) and ozone destruction index, the fluorocarbon-based blowing agents have been replaced by non-halogen hydrocarbon blowing agents, which can cause deterioration in insulating properties due to large cell size and higher thermal conductivity than the fluorocarbon-based blowing agents. In other words, as the gaseous blowing agents having thermal conductivity ($\lambda g$) are replaced by the non-halogen hydrocarbon blowing agents due to environmental regulations, it is difficult to improve the thermal conductivity, and the thermal conductivity ($\lambda m$) of the polyurethane resin can be improved only by replacing the urethane foam. Thus, studies have been actively carried out to reduce the radiant thermal conductivity.

Korean Patent Publication No. 2005-73500A discloses a method of improving heat insulating properties of urethane foam, in which a perfluorinated alkene-based nucleating agent is used to decrease the cell size of the urethane foam. However, this method cannot suitably solve environmental problems caused by the perfluorinated alkene-based nucleating agent.

U.S. Patent Publication Nos. 2005/79352 and 2004/176486 disclose urethane foam which contains thermally expandable fine particles. These inventions were developed to replace a flammable blowing agent with the thermally expandable fine particles and could not improve heat insulating properties since the urethane foam contains an excess of the thermally expandable fine particles as compared with the flammable blowing agent.

Meanwhile, U.S. Pat. No. 5,604,265 discloses polyurethane foam which contains carbon black in order to improve heat insulating properties. However, the polyurethane foam may exhibit only limited improvement of heat insulating properties.

SUMMARY OF THE INVENTION

The present invention provides highly insulating rigid polyurethane foam. The rigid polyurethane foam can include cells having a small and uniform size. The rigid polyurethane foam can also exhibit excellent heat insulating properties and strength and can be suited for heat insulating materials for refrigerators and freezers, buildings, and vehicles.

The present invention also provides a method for manufacturing rigid polyurethane foam, which can allow adjustment of cell size. The invention also provides a method for stably manufacturing highly insulating rigid polyurethane foam.

The rigid polyurethane foam includes thermally expandable fine particles placed or located between at least two adjacent unit cells to penetrate into at least one unit cell (that is, the particles can be located so that at least a portion of the particles can penetrate into a unit cell and thus be exposed to the inside of the unit cell) and/or to be exposed therefrom (from at least one unit cell) (that is, the particles can be located so that at least a portion of the particles can extend or project outwardly from and thus be exposed to the outside of a unit cell), and a filler dispersed on surfaces of the thermally expandable fine particles, and/or on inner and/or outer surfaces of the unit cells.

In one embodiment, the thermally expandable fine particles may be formed to penetrate a strut, cell wall and/or cell vertex of a cell frame.

The thermally expandable fine particles may have a hollow structure.

In one embodiment, the foam may include the thermally expandable fine particles in an amount of about 0.5 parts by weight to about 10 parts by weight based on about 100 parts by weight of a urethane resin forming the polyurethane foam.

In one embodiment, the thermally expandable fine particles may have a mean volume diameter of about 5 μm to about 40 μm before being foamed.

In one embodiment, the thermally expandable fine particles may have an encapsulated structure obtained by encapsulation of a hydrocarbon-based foamable compound by a polymer shell. The hydrocarbon-based foamable compound may have a boiling point of about −10° C. to about 50° C., and a polymer material constituting the polymer shell may have a glass transition temperature of about 40° C. to about 100° C.

The filler may have an average particle diameter of about 0.01 μm to about 50 μm.

The filler may include carbon black, graphite, carbon nanotubes, carbon fibers, titanium dioxide, silica, clay, and/or the like.

The foam may include the filler in an amount of about 0.1 parts by weight to about 10 parts by weight based on about 100 parts by weight of a polyol.

In one embodiment, the cells may be formed by foaming with a blowing agent. The blowing agent and the thermally expandable fine particles may have a weight ratio of about 1:0.2 to about 2:1.

The blowing agent may include $C_5$-$C_6$ hydrocarbons, dialkyl ethers, alkyl alkanoates, halogenated hydrocarbons, acetone, water, and/or the like.

In one embodiment, the cells may have an average diameter of about 100 μm to about 400 μm.

In one embodiment, the rigid polyurethane foam may have a foam density of about 20 g/cm³ to about 40 g/cm³, a thermal conductivity (K-factor) of about 145×10⁻⁴ kcal/m·h·° C. to about 165×10⁻⁴ kcal/m·h·° C. according to ASTM-C518, and a cell close ratio of about 85% to about 99%.

In another embodiment, the rigid polyurethane foam may have a foam density of about 30 g/cm³ to about 37 g/cm³, a thermal conductivity (K-factor) of about $155 \times 10^{-4}$ kcal/m·h·°C. to about $163 \times 10^{-4}$ kcal/m·h·°C. according to ASTM-C518, and a cell close ratio of about 90% to about 99%.

The method for manufacturing the rigid polyurethane foam includes: preparing a dispersion liquid by dispersing thermally expandable fine particles and a filler in a premixed polyol; adding a blowing agent to the dispersion liquid; and forming rigid polyurethane foam by reacting an isocyanate with the dispersion liquid containing the blowing agent, and foaming the reactant with heat of urethane reaction, wherein the blowing agent and the thermally expandable fine particles are present in a weight ratio of about 1:0.2 to about 2:1.

In one embodiment, the premixed polyol may include a polyol, a dispersant, a catalyst, and water.

The thermally expandable fine particles may have a mean volume diameter of about 5 μm to about 40 μm before being foamed.

The filler may be present in an amount of about 0.1 parts by weight to about 10 parts by weight based on about 100 parts by weight of a polyol.

In one embodiment, the isocyanate may be added in an amount of about 90 parts by weight to about 200 parts by weight based on about 100 parts by weight of the polyol.

The present invention may provide rigid polyurethane foam, which exhibits excellent heat insulating properties, has a small and uniform cell size, and excellent strength to be suited for heat insulating materials for refrigerators and freezers, buildings and vehicles. Further, the present invention may provide a method for stably manufacturing rigid polyurethane foam, which has high heat insulating properties and allows easy adjustment of cell size.

DETAILED DESCRIPTION OF THE INVENTION

The present invention now will be described more fully hereinafter in the following detailed description of the invention, in which some, but not all embodiments of the invention are described with reference to the accompanying drawings. Indeed, this invention may be embodied in many different forms and should not be construed as limited to the embodiments set forth herein; rather, these embodiments are provided so that this disclosure will satisfy applicable legal requirements.

Figure 1:
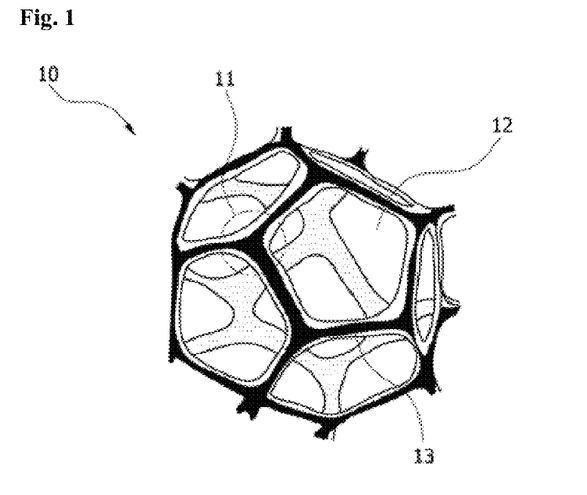
FIG. 1 is a diagram of a typical unit cell structure.

FIG. 1 is a diagram of a typical unit cell structure. As shown therein, a unit cell includes cell walls 12 and struts 13 placed between the cell walls 12 adjoining each other, wherein the struts 13 constitute a frame of the unit cell. Herein, a point at which the struts 13 meet will be defined as a cell vertex 11.

Figure 2:
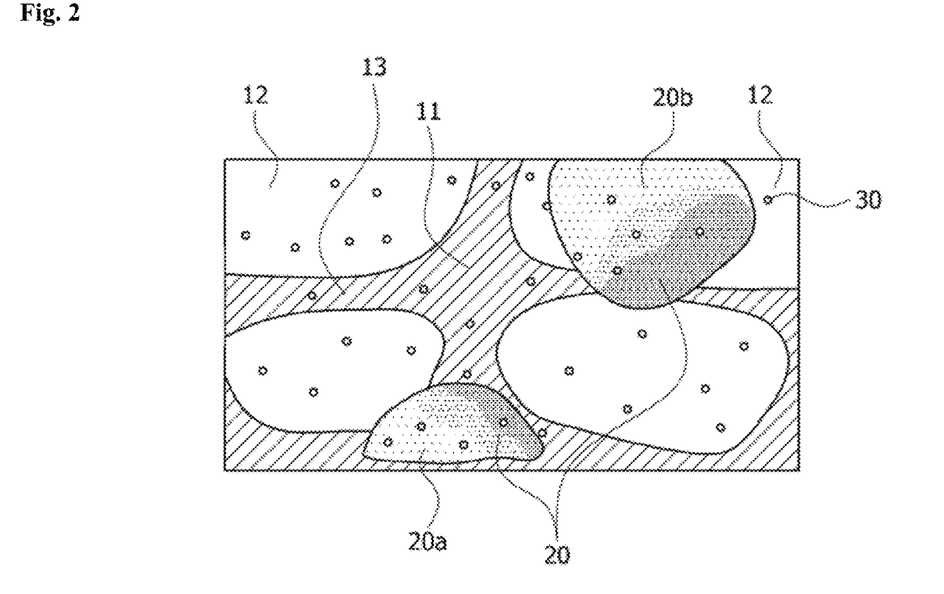
FIG. 2 is a schematic view of a cell interior of rigid polyurethane foam in accordance with one embodiment of the present invention.

In some embodiments, thermally expandable fine particles may be formed to penetrate the strut, cell wall and/or cell vertex of the cell frame. FIG. 2 is a schematic view of a cell interior of rigid polyurethane foam in accordance with one embodiment. As shown therein, the thermally expandable fine particles may be formed to penetrate a cell wall 12 like a thermally expandable fine particle 20b, and/or may be formed to penetrate the cell strut 13 like a thermally expandable fine particle 20a. Further, although not shown in the drawings, the thermally expandable fine particles may be formed to penetrate the cell vertex 11.

A filler 30 is dispersed on inner and/or outer surfaces of the cell, which includes the cell walls 12, the cell struts 13 and/or the cell vertex 11, and/or on the surface of the thermally expandable fine particle. The filler may be substantially uniformly dispersed, or may be locally dispersed.

In this way, the thermally expandable fine particles are interposed between two or more cells and serve to adjust cell size of urethane foam. Specifically, the thermally expandable fine particles are foamed at a certain temperature or higher, and during foaming of polyurethane foam, the thermally expandable fine particles suppress increase in cell size while the thermally expandable fine particles and the blowing agent of the urethane foam are actively foamed, thereby enabling adjustment of the cell size of the urethane foam.

Figure 3:
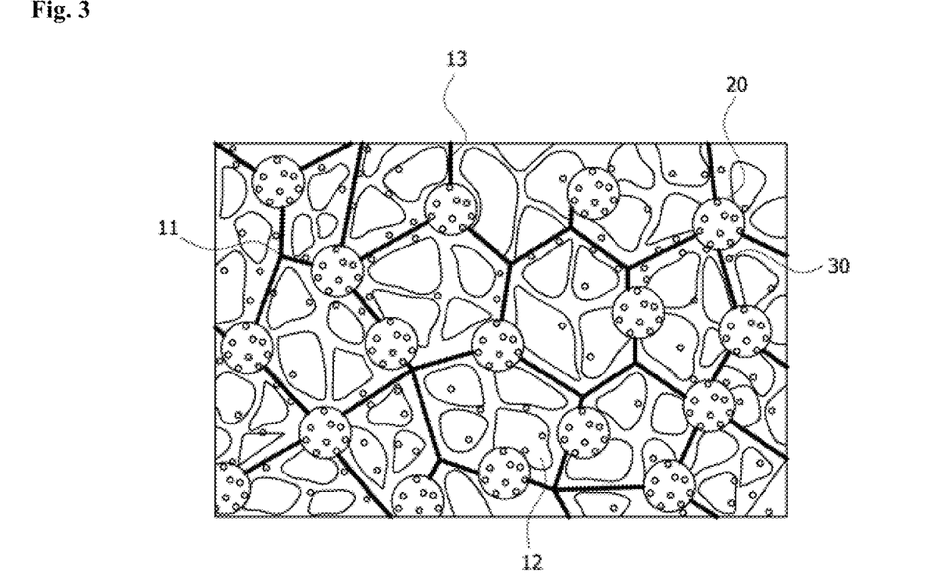
FIG. 3 is a diagram of rigid polyurethane foam in accordance with one embodiment of the present invention.

FIG. 3 is a diagram of rigid polyurethane foam in accordance with one embodiment of the present invention. As shown in this figure, thermally expandable fine particles 20 are placed between two or more adjacent cells. As a result, the thermally expandable fine particles 20 may be configured to penetrate a unit cell and/or to be exposed therefrom through cell walls 12, cell struts 13 and/or cell vertex 11. A filler 30 is distributed on surfaces of the thermally expandable fine particles 20 and/or on inner and outer surfaces of the unit cells.

The rigid polyurethane foam according to the present invention may adjust radiant thermal conductivity by allowing adjustment of the cell size through the thermally expandable fine particles, and may further improve insulating properties by containing the filler serving to absorb or block radiant heat.

The thermally expandable fine particles have a hollow structure. In some embodiments, the thermally expandable fine particles may have an encapsulation structure in which a hydrocarbon-based foamable compound is encapsulated by a polymer shell.

The thermally expandable fine particles expand when a certain amount of heat is applied thereto, and an expansion starting temperature (Tstart) and a maximum expansion temperature (Tmax) of the thermally expandable fine particles are determined according to the boiling point of the hydrocarbon-based foamable compound contained therein and a glass transition temperature of the polymer material constituting the shell. Further, the degree of maximum expansion (Dmax) of the thermally expandable fine particles is adjusted according to the content of the hydrocarbon-based foamable compound and gas permeability of the polymer material.

The expansion starting temperature (Tstart) refers to a temperature at which displacement of a probe starts, the maximum expansion temperature (Tmax) refers to a temperature at which the probe reaches maximum displacement, and the degree of maximum displacement (Dmax) refers to a displacement when the probe reaches the maximum displacement. All of these parameters are measured using a thermomechanical analyzer TMA Q-400 (TA Instrument).

In some embodiments, the thermally expandable fine particles may have an expansion starting temperature (Tstart) of about 50° C. to about 110° C., for example about 60° C. to about 85° C.

In addition, the thermally expandable fine particles may have a maximum expansion temperature (Tmax) of about 60° C. to about 120° C., for example about 90° C. to about 110° C.

The thermally expandable fine particles may have a degree of maximum displacement (Dmax) of about 1000 μm or more, for example about 1500 μm or more, and as another example about 2000 μm to about 3000 μm.

The polymer material constituting the polymer shell may have a glass transition (Tg) temperature of about 40° C. to about 100° C. When the polymer material of the polymer shell has a Tg within this temperature range, it is possible to obtain desirable parameters in terms of the expansion starting temperature (Tstart), maximum expansion temperature (Tmax) and degree of maximum displacement (Dmax).

In some embodiments, the polymer material constituting the polymer shell is prepared through polymerization of polymeric components including a vinyl cyanide compound, a (meth)acrylate compound, a halogenated vinyl compound and a crosslinking agent.

In some embodiments, the hydrocarbon-based foamable compound may have a boiling point of about −10° C. to about 50° C. When the hydrocarbon-based foamable compound has a boiling point within this range of temperature, it is possible to obtain desirable results in terms of the expansion starting temperature (Tstart), maximum expansion temperature (Tmax) and degree of maximum displacement (Dmax).

Examples of the hydrocarbon-based foamable compound may include without limitation $C_3$-$C_6$ hydrocarbons such as propane, butane, isobutane, n-pentane, isopentane, neopentane, cyclopentane, hexane, cyclohexane, and the like, and combinations thereof.

In one embodiment, the thermally expandable fine particles may be prepared through polymerization of a suspension, which is obtained by mixing an oil-based solution, which contains a vinyl cyanide compound, a (meth)acrylate compound, a halogenated vinyl compound, a crosslinking agent and a hydrocarbon-based foamable compound, with an aqueous dispersion liquid containing colloidal silica.

Examples of the vinyl cyanide compound may include without limitation acrylonitrile, methacrylonitrile, and the like. These may be used alone or in combination thereof.

Examples of the (meth)acrylate compound may include without limitation methyl acrylate, ethyl acrylate, propyl acrylate, butyl acrylate, methyl methacrylate, ethyl methacrylate, propyl methacrylate, butyl methacrylate, isobornyl methacrylate, and the like. These may be used alone or in combination thereof.

Examples of the halogenated vinyl compound may include without limitation vinyl chloride, vinylidene chloride, vinyl bromide, and the like. These may be used alone or in combination thereof.

A method of preparing the thermally expandable fine particles is disclosed in Korean Patent Application No. 2009-114962, which is incorporated herein by reference in its entirety.

In one embodiment, the thermally expandable fine particles may have may have a mean volume diameter of about 5 μm to about 40 μm, for example about 10 μm to about 35 μm, before being foamed. In some embodiments, the thermally expandable fine particles may have a mean volume diameter of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 μm. Further, according to some embodiments of the present invention, the mean volume diameter of the thermally expandable fine particles before being foamed can be in a range from about any of the foregoing amounts to about any other of the foregoing amounts.

When the thermally expandable fine particles before being foamed have a mean volume diameter within the above range, the thermally expandable fine particles can be uniformly distributed in the urethane foam, thereby reducing thermal conductivity through adjustment of the cell size of the urethane foam.

In one embodiment, the thermally expandable fine particles may be present in an amount of about 0.5 parts by weight to about 10 parts by weight based on about 100 parts by weight of a urethane resin forming the polyurethane foam. As used herein, the amount of the urethane resin is defined with reference to the total amount of a polyol and an isocyanate. In some embodiments, the thermally expandable fine particles may be present in an amount of about 0.5, 0.6, 0.7, 0.8, 0.9, 1, 2, 3, 4, 5, 6, 7, 8, 9, or 10 parts by weight. Further, according to some embodiments of the present invention, the amount of thermally expandable fine particles can be in a range from about any of the foregoing amounts to about any other of the foregoing amounts.

When the amount of thermally expandable fine particles is within the above range, it is possible to adjust the cell size of the urethane foam within a suitable range while providing excellent thermal insulating properties.

In the present invention, the filler serves to absorb or block radiant heat. Examples of materials capable of absorbing radiant heat may include without limitation carbonaceous materials such as carbon black, graphite, carbon nanotubes, carbon fibers, and the like. In addition, examples of materials capable of blocking heat may include without limitation titanium dioxide, silica, clay, and the like. These may be used alone or in combination thereof. In exemplary embodiments, carbon black, graphite, carbon nanotubes and/or mixtures thereof can be used.

In some embodiments, the filler may have an average particle diameter of about 0.01 μm to about 50 μm. In some embodiments, the filler may an average particle diameter of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 μm. Further, according to some embodiments of the present invention, the filler may have an average particle diameter from about any of the foregoing amounts to about any other of the foregoing amounts.

When the filler has an average particle diameter within this range, the filler may not deform the cell structure of the urethane foam and may not reduce thermal conductivity thereof.

In some embodiments, the filler may be present in an amount of about 0.1 to 10 parts by weight based on about 100 parts by weight of the polyol. In some embodiments, the filler may be present in an amount of about 0.1, 0.2, 0.3, 0.4, 0.5, 0.6, 0.7, 0.8, 0.9, 1, 2, 3, 4, 5, 6, 7, 8, 9, or 10 parts by weight. Further, according to some embodiments of the present invention, the amount of filler can be in a range from about any of the foregoing amounts to about any other of the foregoing amounts.

When the filler is present in an amount within this range, the filler may not deform the cell structure of the urethane foam and may not reduce thermal conductivity of the urethane foam.

The cells of the polyurethane foam according to the present invention may be foamed by the blowing agent, and the weight ratio of the blowing agent to the thermally expandable fine particles may be about 1:0.2 to about 2:1. When the weight ratio of the blowing agent to the thermally expandable fine particles is within this range, suitable balance between foamability of the urethane foam and foamability of the thermally expandable fine particles may be maintained, which can result in a uniform cell size and excellent heat insulating properties.

Examples of the blowing agent may include without limitation $C_5$-$C_6$ hydrocarbons, dialkyl ethers, alkyl alkanoates, halogenated hydrocarbons, acetone, water, and the like. These may be used alone or in combination thereof.

In one embodiment, the cells may have an average diameter of about 100 μm to about 400 μm, for example about 200 μm to about 300 μm.

The rigid polyurethane foam according to the present invention can have high foam density and can exhibit excellent heat insulating properties, and thus may be suitably applied to heat insulating materials for refrigerators and freezers, buildings and vehicles.

In one embodiment, the rigid polyurethane foam may have a foam density of about 20 g/cm$^3$ to about 40 g/cm$^3$, a thermal conductivity (K-factor) of about $145 \times 10^{-4}$ kcal/m·h·°C. to about $165 \times 10^{-4}$ kcal/m·h·°C. according to ASTM-C518, and a cell close ratio of about 85% to about 99%.

In another embodiment, the rigid polyurethane foam may have a foam density of about 30 g/cm$^3$ to about 37 g/cm$^3$, a thermal conductivity (K-factor) of about $155 \times 10^{-4}$ kcal/m·h·°C. to about $163 \times 10^{-4}$ kcal/m·h·°C. according to ASTM-C518, and a cell close ratio of about 90% to about 99%.

According to the present invention, a method for manufacturing the rigid polyurethane foam includes: preparing a dispersion liquid by dispersing thermally expandable fine particles and a filler in a premixed polyol; adding a blowing agent to the dispersion liquid; and forming rigid polyurethane foam by reacting an isocyanate with the dispersion liquid containing the blowing agent, and foaming the reactant with heat of urethane reaction.

In one embodiment, the premixed polyol may include a polyol, a dispersant, a catalyst, and water. Selection and preparation of the respective components used for preparation of the premixed polyol may be suitably carried out by a person having ordinary knowledge in the art.

The thermally expandable fine particles and the filler are mixed with the premixed polyol.

In one embodiment, the thermally expandable fine particles are added in an amount of about 0.5 to 10 parts by weight based on about 100 parts by weight of a urethane resin forming the polyurethane foam, and the filler is mixed in an amount of about 0.1 to 10 parts by weight based on about 100 parts by weight of the polyol.

After mixing the thermally expandable fine particles and the filler with the premixed polyol, the obtained mixture is subjected to dispersion using a dispersing machine, thereby preparing the dispersion liquid.

Then, the blowing agent is added to the dispersion liquid prepared as above under conditions that the weight ratio of the blowing agent to the thermally expandable fine particles is about 1:0.2 to about 2:1.

Then, the isocyanate is reacted with the dispersion liquid to which the blowing agent has been added. The isocyanate may be added in an amount of about 90 to about 200 parts by weight based on about 100 parts by weight of the polyol. Addition of the isocyanate causes the dispersion liquid to be foamed by heat generated upon urethane reaction, thereby forming urethane foam. The filler is uniformly distributed on inner and/or outer surfaces of the cells and/or on the surfaces of the thermally expandable fine particles.

The thermally expandable fine particles may have a mean volume diameter of about 5 μm to about 40 μm before being foamed, and a mean volume diameter of about 20 μm to about 200 μm after foaming.

Hereinafter, the constitution and functions of the present invention will be explained in more detail with reference to the following examples. It should be understood that these examples are provided for illustration only and are not to be in any way construed as limiting the present invention.

Descriptions of details apparent to those skilled in the art will be omitted herein.

EXAMPLES

Preparative Example 1

Preparation of Thermally Expandable Fine Particles

An oil-based solution is prepared by mixing 64 g of vinylidene chloride, 64 g of acrylonitrile, 16 g of methylacrylate, 16 g of methyl methacrylate, 0.3 g of dipentaerythritol hexaacrylate, 16 g of isopentane, 16 g of n-pentane, and 1.6 g of di-2-ethylhexyl peroxydicarbonate.

In addition, an aqueous solution is prepared by mixing 450 g of ion exchange water, 108 g of sodium chloride, 36 g of colloidal silica (Ludox-AM), 0.5 g of polyvinyl pyrrolidone and 1.2 g of 1% aqueous solution of sodium nitrite to have a pH of 3.0.

The prepared oil-based solution and the aqueous solution are mixed and dispersed at 5000 RPM for 2 minutes using a homomixer (2.5 Primix), thereby preparing a suspension. The suspension is placed in a 1-liter compression reactor and subjected to nitrogen substitution, followed by polymerization at an initial reaction pressure of 5 kgf/cm$^2$ and 60° C. for 20 hours while stirring at 400 rpm. The polymerized product is filtered and dried to obtain thermally expandable fine particles. The particle diameter and foaming properties of the prepared thermally expandable fine particles are analyzed and results are summarized in Table 1.

TABLE 1

| | Item | Preparative Example1 |
|---|---|---|
| Particle diameter | Particle diameter before being foamed (μm) | 26.8 |
| | C.V (%) | 45.5 |
| | Particle diameter after foaming (μm) | 125.6 |
| Foaming properties | Tstart (° C.) | 75 |
| | Tmax (° C.) | 105 |
| | Dmax (μm) | 2332 |

* Particle diameter before being foamed: The mean volume diameter and the coefficient of size variation of the fine particles are analyzed using a laser diffraction type particle size analyzer (LS 13320, Beckman Coulter).
* Particle diameter after foaming: After being left in an oven at Tmax for 3 minutes, the foamed particles are observed using an optical microscope (BX51, OLYPUS), and the mean volume diameter of the foamed particles are analyzed using an image analyzer (TOMORO ScopeEye 3.6, SARAM SOFT).

Example 1

A premixed polyol is prepared by mixing a dispersant, a catalyst, water and a polyol according to a composition as shown in Table 2, and the thermally expandable fine particles prepared in Preparative Example 1 and a filler, that is, carbon black (ELFTEX8) produced by Cabot, are added to the premixed polyol, followed by dispersion using a planetary centrifugal mixer (ARM-310, THINKY Corporation). An isocyanate is added to the premixed polyol containing the thermally expandable fine particles and the filler in a ratio (premixed polyol to isocyanate) of 100:118, mixed at 5000 RPM for 5 seconds using a homomixer (Homo Disper 2.5, Primix), followed by reaction in a vertical mold (250×250×50).

TABLE 2

| | Item | Content |
|---|---|---|
| (Premixed Polyol) | Toluene diamine polyol (OH value: 350~550) | 60.0 |
| | Sucrose/glycerin polyol (OH value: 360~490) | 20.0 |
| | Trimethylolpropane polyol (OH value: 350~450) | 10.0 |
| | Glycerin polyol (OH value: 168~670) | 10.0 |
| | Dispersant (polyester polydimethylsiloxane copolymer) | 2.5 |
| | Amine catalyst | 2.0 |
| | Water | 1.9 |
| | Blowing agent (Cyclo-pentane)* | 16.5 |
| | Isocyanate (MDI, amine equivalent: 135) | 145.1 |

*The blowing agent content is based on the content of polyurethane foam.

The cell size, foam density, K-Factor and cell close ratio of the prepared polyurethane foam are analyzed by the following methods, and results thereof are shown in Table 3.

1) Thermal conductivity (K-factor): Urethane foam prepared by a hand mixer process is cut into a standard size of 200×200×25 and analyzed as to thermal conductivity using a thermal conductivity analyzer (HC-074, EKO). Analysis of the thermal conductivity is carried out in a heat flow fashion according to ASTM-C518 (unit: $10^{-4}$ kcal/m·h·°C.).

2) Cell size: Urethane foam is observed using SEM (54800, Hitachi) at a magnification of 50×, and the cell size of the foam is converted into a mean volume diameter using an image analyzer (TOMORO ScopeEye 3.6, SARAM SOFT).

3) Cell close ratio (%): Cell close ratio is represented by percentage of closed cells among urethane foam cells. The cell close ratio is measured from the urethane foam cut into a standard size of 25×25×25 using a Ultrapycnomter 1000 (Quantachrome).

4) Analysis of Thermally Expandable Property: TMA Q-400 (Thermomechanical Analyzer, TA Instruments) is used to analyze thermally expandable property. 1.0 mg of thermally expandable fine particles is placed on an aluminum fan having a diameter of 6.7 mm and a depth of 4.5 mm and covered by an aluminum fan having a diameter of 6.5 mm and a depth of 4.0 mm to prepare specimens. According to a TMA expansion probe type, the thermally expandable fine particles are heated from room temperature to 200° C. under a load of 0.05 N applied from a probe, and displacement of the probe in a vertical direction is analyzed.

expansion starting temperature (Tstart): Temperature at which displacement of probe starts     maximum expansion temperature (Tmax): Temperature at which the probe reaches maximum displacement     degree of maximum displacement (Dmax): Displacement (μm) when the probe reaches maximum displacement Example 2

Figure 4:
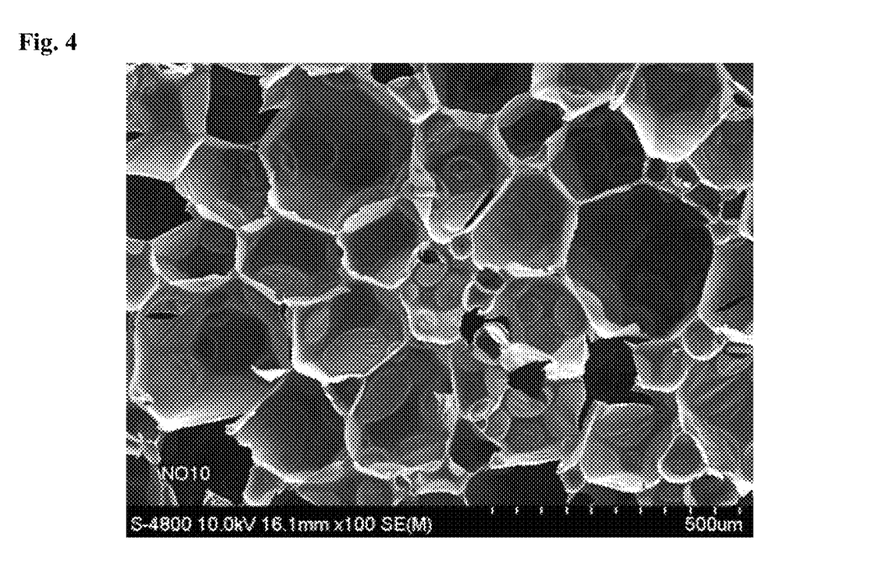
FIG. 4 is a scanning electron micrograph (magnification ×100) of urethane foam prepared in Example 2.
Figure 5:
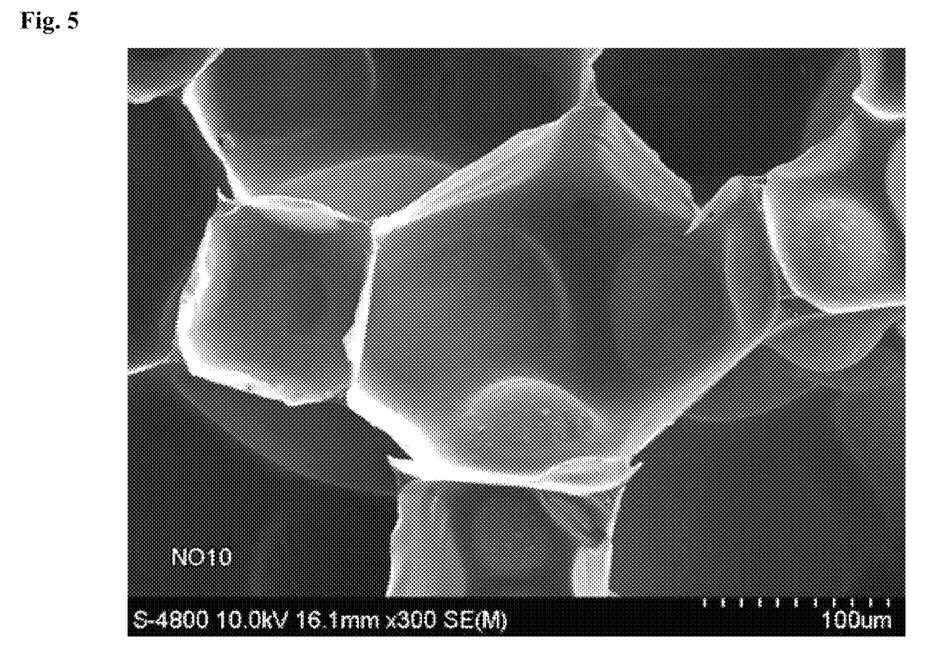
FIG. 5 is a scanning electron micrograph (magnification ×300) of urethane foam prepared in Example 2.

Polyurethane foam is prepared in the same manner as in Example 1 except that graphite TIMREX KS6 (manufactured by TIMGAL Inc.) having a particle diameter of 6.5 μm is used as the filler. SEM images of the prepared polyurethane foam are shown in FIG. 4 (magnification×100) and FIG. 5 (magnification×300), and analysis results of the cell size, foam density, K-Factor and cell close ratio of the polyurethane foam are summarized in Table 3.

Example 3

Polyurethane foam is prepared in the same manner as in Example 1 except that multiwall carbon nanotubes CNT M85 (manufactured by Carbon-Nanotech Inc.) are used as the filler and the composition is changed as in Table 3. Analysis results of the cell size, foam density, K-Factor and cell close ratio of the polyurethane foam are summarized in Table 3.

Example 4

Polyurethane foam is prepared in the same manner as in Example 1 except that single wall carbon nanotubes CNT S95 (manufactured by Carbon-Nanotech Inc.) are used as the filler and the composition is changed as in Table 3. Analysis results of the cell size, foam density, K-Factor and cell close ratio of the polyurethane foam are summarized in Table 3.

Example 5

Polyurethane foam is prepared in the same manner as in Example 1 except that titanium oxide R900 (manufactured by Dupont) is used as the filler. Analysis results of the cell size, foam density, K-Factor and cell close ratio of the polyurethane foam are summarized in Table 3.

Example 6

Polyurethane foam is prepared in the same manner as in Example 1 except that titanium oxide R960 (manufactured by Dupont) is used as the filler. Analysis results of the cell size, foam density, K-Factor and cell close ratio of the polyurethane foam are summarized in Table 3

Example 7

Polyurethane foam is prepared in the same manner as in Example 1 except that silica Aerosil OX50 (manufactured by Evonik) is used as the filler. Analysis results of the cell size, foam density, K-Factor and cell close ratio of the polyurethane foam are summarized in Table 3.

Example 8

Polyurethane foam is prepared in the same manner as in Example 1 except that silica Aerosil R7200 (manufactured by Evonik) is used as the filler and the foaming temperature was 80° C. Analysis results of the cell size, foam density, K-Factor and cell close ratio of the polyurethane foam are summarized in Table 3.

Example 9

Polyurethane foam is prepared in the same manner as in Example 1 except that nanoclay I44P (manufactured by Nanocor) is used as the filler. Analysis results of the cell size, foam density, K-Factor and cell close ratio of the polyurethane foam are summarized in Table 3.

TABLE 3

| | | Example | | | | | | | | | |
|---|---|---|---|---|---|---|---|---|---|---|---|
| | | 1 | 2 | 3 | 4 | 5 | 6 | 7 | 8 | 9 | 15 |
| Polyol | | 100 | 100 | 100 | 100 | 100 | 100 | 100 | 100 | 100 | 100 |
| Dispersant | | 2.5 | 2.5 | 2.5 | 2.5 | 2.5 | 2.5 | 2.5 | 2.5 | 2.5 | 2.5 |
| Catalyst | | 2.0 | 2.0 | 2.0 | 2.0 | 2.0 | 2.0 | 2.0 | 2.0 | 2.0 | 2.0 |
| Water | | 1.9 | 1.9 | 1.9 | 1.9 | 1.9 | 1.9 | 1.9 | 1.9 | 1.9 | 1.9 |
| Blowing agent | | 12.0 | 12.0 | 12.0 | 12.0 | 12.0 | 12.0 | 12.0 | 12.0 | 12.0 | 12.0 |
| MDI | | 145.1 | 145.1 | 145.1 | 145.1 | 145.1 | 145.1 | 145.1 | 145.1 | 145.1 | 145.1 |
| Thermally expandable fine particles | Amount (parts by weight) | 12.5 | 12.5 | 12.5 | 12.5 | 12.5 | 12.5 | 12.5 | 12.5 | 12.5 | 12.5 |
| Filler | Kind | ELFTEX8 | TIMREX KS6 | CNT M85 | CNT S95 | R900 | R960 | OX50 | R7200 | I44P | ELFTEX8/ TIMREX KS6 |
| | Amount (parts by weight) | 3.0 | 3.0 | 1.0 | 1.0 | 3.0 | 3.0 | 3.0 | 3.0 | 3.0 | 2.5/ 2.5 |
| Foaming Temp. (° C.) | | 40 | 40 | 40 | 40 | 40 | 40 | 40 | 80 | 40 | 40 |
| Cell Size (μm) | | 265 | 258 | 270 | 268 | 272 | 269 | 270 | 265 | 270 | 250 |
| Foam density (g/cm$^3$) | | 33.1 | 33.3 | 32.1 | 32.0 | 32.5 | 33.5 | 32.5 | 32.3 | 32.4 | 33.8 |
| K-Factor | | 162.7 | 162.0 | 163.5 | 163.8 | 163.8 | 163.2 | 164.4 | 164.4 | 164.4 | 160.2 |
| Cell close ratio | | 92.8 | 92.6 | 91.2 | 91.8 | 92.1 | 91.5 | 89.5 | 88.4 | 90.1 | 92.5 |

As shown in Table 3, it can be seen that the use of carbon black (Example 1) or graphite (Example 2) as the filler for absorbing heat provides superior results in terms of K-factor improvement as compared to the use of TiO$_2$ (Examples 5 and 6), SiO$_2$ filler (Examples 7 and 8) and nanoclay (Example 9) acting as heat reflecting elements. In particular, remarkable improvement in K-factor can be confirmed from Example 15 (described below) wherein carbon black and graphite is mixed with the thermally expandable fine particles.

Examples 10 to 12

Polyurethane foam is prepared in the same manner as in Example 1 except that the amount of the filler is changed as set forth in Table 4. Analysis results of the cell size, foam density, K-Factor and cell close ratio of the polyurethane foam are summarized in Table 4.

TABLE 4

| | | Example | | | |
|---|---|---|---|---|---|
| | | 1 | 10 | 11 | 12 |
| Polyol | | 100 | 100 | 100 | 100 |
| Dispersant | | 2.5 | 2.5 | 2.5 | 2.5 |
| Catalyst | | 2.0 | 2.0 | 2.0 | 2.0 |
| Water | | 1.9 | 1.9 | 1.9 | 1.9 |
| Blowing agent | | 12.0 | 12.0 | 12.0 | 12.0 |
| MDI | | 145.1 | 145.1 | 145.1 | 145.1 |
| Thermally expandable fine particles | Amount (parts by weight) | 12.5 | 12.5 | 12.5 | 12.5 |
| Filler | Kind | ELFTEX8 | ELFTEX8 | ELFTEX8 | ELFTEX8 |
| | Amount (parts by weight) | 3.0 | 1.0 | 5.0 | 10.0 |
| Foaming Temp. (° C.) | | 40 | 40 | 40 | 40 |
| Cell Size (μm) | | 265 | 280 | 263 | 252 |
| Foam density (g/cm$^3$) | | 33.1 | 32.5 | 33.8 | 33.8 |
| K-Factor | | 162.7 | 164.8 | 160.1 | 163.2 |
| Cell close ratio | | 92.8 | 92.4 | 93.2 | 87.3 |

As shown in Table 4, it can be seen that the K-factor improved with increasing amount of the filler, and that, when the filler is present in an amount of 10%, the thermal conductivity of the urethane foam is increased due to increase in cell open rate of the urethane foam by the filler.

Examples 13 and 14

Polyurethane foam is prepared in the same manner as in Example 1 except that the amount of the filler is changed as set forth in Table 5. Analysis results of the cell size, foam density, K-Factor and cell close ratio of the polyurethane foam are summarized in Table 5.

TABLE 5

| | | Example | | |
|---|---|---|---|---|
| | | 2 | 13 | 14 |
| Polyol | | 100 | 100 | 100 |
| Dispersant | | 2.5 | 2.5 | 2.5 |
| Catalyst | | 2.0 | 2.0 | 2.0 |
| Water | | 1.9 | 1.9 | 1.9 |
| Blowing agent | | 12.0 | 12.0 | 12.0 |
| MDI | | 145.1 | 145.1 | 145.1 |
| Thermally expandable fine particles | Amount (parts by weight) | 12.5 | 12.5 | 12.5 |
| Filler | Kind | TIMREX KS6 | TIMREX KS6 | TIMREX KS6 |
| | Amount (parts by weight) | 3.0 | 5.0 | 10.0 |
| Foaming Temp. (° C.) | | 40 | 40 | 40 |
| Cell Size (μm) | | 258 | 248 | 252 |
| Foam density (g/cm$^3$) | | 33.3 | 33.8 | 34.3 |
| K-Factor | | 162.0 | 159.8 | 162.2 |
| Cell close ratio | | 92.6 | 92.5 | 88.5 |

As shown in Table 5, it can be seen that the K-factor improved with increasing amount of the filler, and that, when the filler is present in an amount of 10%, the thermal conductivity of the urethane foam increased due to increase in cell open rate of the urethane foam by the filler.

Example 15

Polyurethane foam is prepared in the same manner as in Example 1 except that carbon black ELFTEX8 (available from Cabot) and graphite TIMREX KS6 (available from TIMGAL) are added as the filler in the amounts as shown in Table 3. Analysis results of the cell size, foam density, K-Factor and cell close ratio of the polyurethane foam are summarized in Table 3.

Comparative Examples 1 to 9

Polyurethane foam is prepared in the same manner as in Example 1 except that the amount of each component is changed as set forth in Table 6. Analysis results of the cell size, foam density, K-Factor and cell close ratio of the polyurethane foam are summarized in Table 6.

TABLE 6

| | | Comparative Example | | | | | | | | |
|---|---|---|---|---|---|---|---|---|---|---|
| | | 1 | 2 | 3 | 4 | 5 | 6 | 7 | 8 | 9 |
| Polyol | | 100 | 100 | 100 | 100 | 100 | 100 | 100 | 100 | 100 |
| Dispersant | | 2.5 | 2.5 | 2.5 | 2.5 | 2.5 | 2.5 | 2.5 | 2.5 | 2.5 |
| Catalyst | | 2.0 | 2.0 | 2.0 | 2.0 | 2.0 | 2.0 | 2.0 | 2.0 | 2.0 |
| Water | | 1.9 | 1.9 | 1.9 | 1.9 | 1.9 | 1.9 | 1.9 | 1.9 | 1.9 |
| Blowing agent | | 12.0 | 12.0 | 12.0 | 12.0 | 12.0 | 12.0 | 12.0 | 12.0 | 12.0 |
| MDI | | 145.1 | 145.1 | 145.1 | 145.1 | 145.1 | 145.1 | 145.1 | 145.1 | 145.1 |
| Thermally expandable fine particles | Amount (parts by weight) | — | 12.5 | — | — | — | — | — | 30 | 30 |
| Filler | Kind | — | — | ELFTEX8 | ELFTEX8 | TIMREX KS6 | R900 | OX50 | ELFTEX8 | TIMREX KS6 |
| | Amount (parts by weight) | — | — | 3.0 | 5.0 | 3.0 | 3.0 | 3.0 | 3.0 | 3.0 |
| Foaming Temp. (° C.) | | 40 | 40 | 40 | 40 | 40 | 40 | 40 | 40 | 40 |
| Cell Size (μm) | | 353 | 288 | 330 | 315 | 323 | 332 | 338 | 259 | 263 |
| Foam density (g/cm$^3$) | | 31.8 | 32.1 | 32.4 | 32.8 | 32.5 | 32.1 | 33.0 | 36.7 | 37.4 |
| K-Factor | | 170.8 | 165.5 | 167.2 | 164.8 | 166.5 | 168.2 | 169.5 | 177.2 | 176.5 |
| Cell close ratio | | 93.7 | 92.1 | 92.5 | 92.3 | 91.5 | 91.2 | 91.8 | 82.2 | 81.8 |

As shown in Table 6, it can be seen that, in Comparative Example 1, in which the thermally expandable fine particles and the filler are not used, the polyurethane foam has a remarkably high K-Factor, and that in Comparative Example 2, in which the filler is not used, the polyurethane foam underwent slight reduction in cell size and K-Factor and is not desirable as compared with Example 1. Meanwhile, it can be seen that, in Comparative Examples 3 and 4, in which the thermally expandable fine particles are not used, the polyurethane foam has much greater cell size and K-factor than Examples 1 and 11 and is significantly reduced in cell close ratio. The same results could be obtained when comparing Comparative Example 5 with Example 2, Comparative Example 6 with Example 5, and Comparative Example 7 with Example 7. Further, in Comparative Examples 8 and 9, in which the amount of the thermally expandable fine particles is not within the inventive range, the thermally expandable fine particles destroyed the cells instead of being uniformly distributed within the cell walls and the struts, and there is no reduction in K-Factor through reduction of the cell close ratio.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A rigid polyurethane foam comprising unit cells, comprising: thermally expandable fine particles placed between at least two adjacent unit cells to penetrate into a unit cell, to be exposed from a unit cell, or both, and a filler dispersed on surfaces of the thermally expandable fine particles, on inner surfaces of the unit cells, on outer surfaces of the unit cells, or on a combination thereof,
wherein the cells have an average diameter of about 200 μm to about 300 μm and the rigid polyurethane foam has a cell close ratio of about 85% to about 99%.

2. The rigid polyurethane foam according to claim 1, wherein the unit cells include a strut forming a cell frame, a cell wall, and a cell vertex, and wherein the thermally expandable fine particles are formed to penetrate a strut, cell wall, cell vertex, or a combination thereof of a unit cell.

3. The rigid polyurethane foam according to claim 1, wherein the thermally expandable fine particles have a hollow structure.

4. The rigid polyurethane foam according to claim 1, wherein the thermally expandable fine particles are present in an amount of about 0.5 parts by weight to about 10 parts by weight based on 100 parts by weight of a urethane resin forming the polyurethane foam.

5. The rigid polyurethane foam according to claim 1, wherein the thermally expandable fine particles have a mean volume diameter of about 5 μm to about 40 μm before being foamed.

6. The rigid polyurethane foam according to claim 1, wherein the thermally expandable fine particles have an encapsulated structure obtained by encapsulation of a hydrocarbon-based foamable compound by a polymer shell, the hydrocarbon-based foamable compound having a boiling point of about −10° C. to about 50° C., and a polymer material constituting the polymer shell has a glass transition temperature of about 40° C. to about 100° C.

7. The rigid polyurethane foam according to claim 1, wherein the filler has an average particle diameter of about 0.01 μm to about 50 μm.

8. The rigid polyurethane foam according to claim 1, wherein the filler comprises at least one of carbon black, graphite, carbon nanotubes, carbon fibers, titanium dioxide, silica, and clay.

9. The rigid polyurethane foam according to claim 1, wherein the filler is present in an amount of about 0.1 parts by weight to about 10 parts by weight based on 100 parts by weight of a polyol.

10. The rigid polyurethane foam according to claim 1, wherein the cells are formed by foaming with a blowing agent.

11. The rigid polyurethane foam according to claim 10, wherein the blowing agent and the thermally expandable fine particles are present in a weight ratio of about 1:0.2~2.

12. The rigid polyurethane foam according to claim 11, wherein the blowing agent comprises at least one of $C_5$-$C_6$ hydrocarbons, dialkyl ethers, alkyl alkanoates, halogenated hydrocarbons, acetone, and water.

13. The rigid polyurethane foam according to claim 1, wherein the rigid polyurethane foam has a foam density of about 20 g/cm$^3$ to about 40 g/cm$^3$ and a thermal conductivity (K-factor) of about $145 \times 10^{-4}$ kcal/m·h·°C. to about $165 \times 10^{-4}$ kcal/m·h·°C. according to ASTM-C518.

14. The rigid polyurethane foam according to claim 1, wherein the rigid polyurethane foam has a foam density of about 30 g/cm$^3$ to about 37 g/cm$^3$, a thermal conductivity (K-factor) of about $155 \times 10^{-4}$ kcal/m·h·°C. to about $163 \times 10^{-4}$ kcal/m·h·°C. according to ASTM-C518, and a cell close ratio of about 90% to about 99%.

15. A method for manufacturing rigid polyurethane foam, comprising:

preparing a dispersion liquid by dispersing thermally expandable fine particles and a filler in a premixed polyol;

adding a blowing agent to the dispersion liquid; and forming rigid polyurethane foam by reacting an isocyanate with the dispersion liquid containing the blowing agent, and foaming the reactant with heat of urethane reaction, wherein the blowing agent and the thermally expandable fine particles are present in a weight ratio of about 1:0.2~2, wherein the cells have an average diameter of about 200 μm to about 300 μm and the rigid polyurethane foam has a cell close ratio of about 85% to about 99%.

16. The method according to claim 15, wherein the premixed polyol comprises a polyol, a dispersant, a catalyst, and water.

17. The method according to claim 15, wherein the thermally expandable fine particles have a mean volume diameter of about 5 μm to about 40 μm before being foamed.

18. The method according to claim 15, wherein the filler is present in an amount of about 0.1 parts by weight to about 10 parts by weight based on 100 parts by weight of a polyol.

19. The method according to claim 15, wherein the isocyanate is added in an amount of about 90 parts by weight to about 200 parts by weight based on 100 parts by weight of the polyol.

* * * * *

UNITED STATES PATENT AND TRADEMARK OFFICE
CERTIFICATE OF CORRECTION

PATENT NO.        : 9,045,608 B2
APPLICATION NO.   : 13/761749
DATED             : June 2, 2015
INVENTOR(S)       : Kyung Hyun Baek et al.

It is certified that error appears in the above-identified patent and that said Letters Patent is hereby corrected as shown below:

In the Specification

Column 9, Line 36 reads: "2) Cell size: Urethane foam is observed using SEM (~~54800,~~"
and should read: "2) Cell size: Urethane foam is observed using SEM (S4800,"

Signed and Sealed this
Twenty-sixth Day of January, 2016

Michelle K. Lee
*Director of the United States Patent and Trademark Office*